(12) United States Patent
Hossain et al.

(10) Patent No.: US 6,366,944 B1
(45) Date of Patent: Apr. 2, 2002

(54) METHOD AND APPARATUS FOR PERFORMING SIGNED/UNSIGNED MULTIPLICATION

(76) Inventors: Razak Hossain, 1 Tunison La., Bridgewater, NJ (US) 08807; Jeffrey Charles Herbert, 334 Woodline Rd., Nazareth, PA (US) 18064

( * ) Notice: Subject to any disclaimer, the term of this patent is extended or adjusted under 35 U.S.C. 154(b) by 0 days.

(21) Appl. No.: 09/231,131

(22) Filed: Jan. 15, 1999

(51) Int. Cl.$^7$ ............................... G06F 7/52
(52) U.S. Cl. ........................... 708/628; 708/7
(58) Field of Search ................ 708/625, 748.07, 708/626, 627, 628, 629, 630, 631, 632, 7

(56) References Cited

U.S. PATENT DOCUMENTS

| | | | | |
|---|---|---|---|---|
| 3,666,933 A | * | 5/1972 | Grobert ........................ | 708/7 |
| 4,118,785 A | * | 10/1978 | Izumi et al. ................ | 708/620 |
| 4,181,970 A | * | 1/1980 | Izumi et al. ................ | 708/628 |
| 4,592,004 A | * | 5/1986 | Bocker et al. .............. | 708/191 |
| 4,697,247 A | * | 9/1987 | Grinberg et al. ............ | 708/191 |
| 5,005,150 A | * | 4/1991 | Dent et al. .................. | 708/521 |
| 5,412,565 A | * | 5/1995 | Boser et al. .................. | 708/7 |
| 5,555,200 A | * | 9/1996 | Chiang ........................ | 708/7 |
| 5,701,260 A | * | 12/1997 | Nagazumi ................... | 708/7 |
| 5,751,619 A | * | 5/1998 | Agarwal et al. ............. | 708/523 |
| 5,841,684 A | * | 11/1998 | Dockser ....................... | 708/625 |
| 5,862,067 A | * | 1/1999 | Mennemeier et al. .. | 364/748.07 |
| 6,029,187 A | * | 2/2000 | Verbauwhede .............. | 708/625 |
| 6,035,316 A | * | 3/2000 | Peleg et al. .................. | 708/523 |

OTHER PUBLICATIONS

Principles of Computer Architecture, An Integrated Approach, Miles Murdocca, Department of Computer Science, Rutgers University and Miletus Research, Copyright © 1997.*

"A Two's Complement Parallel Array Multiplication Algorithm," Baugh, Charles R., et al., IEEE Transactions on Computers, vol. C–22, No. 12, Dec. 1973, pp. 1045–1047.

"Computer Arithmetic," Hennessy, J.L., et al., Appendix A of Computer Architecture: A Quantitative Approach 2nd Edition, Morgan Kaufman Publishers, San Mateo, CA 1996, pp. A–7 thru A10, and A–46 thru A–57.

"SPIM: A pipelined 64 x 64–bit Iterative Multiplier," Santoro, Mark R., et al., IEEE Journal of Solid–State Circuits, vol. 24, No. 2, Apr. 1989, pp. 487–493.

* cited by examiner

*Primary Examiner*—Kakali Chaki
*Assistant Examiner*—Michael B. Holmes
(74) *Attorney, Agent, or Firm*—Blakely Sokoloff Taylor & Zafman LLP (57) ABSTRACT

An apparatus for performing signed and unsigned multiplication is presented comprising a computation cell to generate a plurality of product terms, a compressor, coupled to the computation cell, and a selector coupled to each of the computation cell and the compressor. As disclosed, the selector selects and passes either a standard partial product term or an inverse thereof to the compressor, based on whether signed or unsigned multiplication is being performed, respectively, while the compressor compresses the received partial product terms into a pair of partial product terms.

21 Claims, 5 Drawing Sheets

METHOD AND APPARATUS FOR PERFORMING SIGNED/UNSIGNED MULTIPLICATION

BACKGROUND OF THE INVENTION

1. Field of the Invention

The present invention relates to the field of digital data processing and, in particular, to a method and apparatus for performing signed/unsigned multiplication.

2. Background Information

The demand for higher performance multimedia applications has prompted the development of faster, more powerful processors that consume less power, and take up less space on a printed circuit board, leaving room for additional feature enhancements. Multiplication is one of the most common, basic tasks needed for computational purposes. Those skilled in the art will appreciate that nearly all multimedia applications such as digital signal processing (DSP), digital filtering, graphics, audio and video rendering require fast, area efficient multipliers. Due to the frequency of multiplication computations, multipliers are not only located within central processing units (CPU) or math co-processors, but in nearly any controller embedded within any digital system. Those skilled in the art will appreciate that unsigned multiplication is performed on numbers represented in floating point format, whereas integer multiplication is performed in a signed, 2's-complement format. Consequently, prior art controllers have typically relied on separate multiplier circuitry, one each for signed and unsigned multiplication.

Simplistically, unsigned multiplication is performed in a controller in much the same way that we learned in elementary school. That is, a multiplicand is multiplied by each digit in the multiplier to create a corresponding number of rows of partial products, which are then summed to produce the final product. Within a controller, multiplication is performed with a series of logic gates, wherein the multiplicand is ANDed with each bit of the multiplier to produce rows of partial products. A number of hierarchically arranged carry-save adders (CSA's) compress the partial products which are then summed to produce the final product. Signed multiplication, however, adds a level of complexity as the sign of each of the multiplicand and multiplier is embedded within the number itself and must be properly carried through the calculation in the partial products. A number of methods have been proposed which deal with the embedded signs inherent in signed multiplication, with the most popular of such methods being Booth's algorithm. A complete description of Booths algorithm can be found, for example, in Hennessy, et al., *Computer Architecture: A Quantitative Approach*, Second Edition, *Appendix A: Computer Arithmetic* by D. Goldberg, Morgan Kaufman Publishers, San Mateo, Calif., 1996.

Architecturally, a number of alternative multiplier designs exist. Those skilled in the art will appreciate that each of the architecturally unique multipliers have been developed with the goal of decreasing the amount of time (measured in clock cycles) necessary to complete multiplication tasks. Those skilled in the art will appreciate, however, that prior art multiplier circuitry is generally quite large, requiring a large amount of die space on the controller. While some of the prior art solutions for increasing the speed of multiplication may have had a collateral effect of reducing the amount of space consumed by the multiplier circuitry, e.g., the Wallace tree architecture, those skilled in the art will appreciate that such space savings were nominal, at best.

Thus, a method and apparatus for performing signed/unsigned multiplication is required that overcomes the inherent limitations and deficiencies commonly associated with the prior art. Just such a method and apparatus is presented in accordance with the teachings of the present invention that achieves these and other desired results.

SUMMARY OF THE INVENTION

In accordance with the teachings of the present invention, a method and apparatus for performing signed and unsigned multiplication is presented. In particular, in accordance with a first embodiment of the present invention, an apparatus is presented comprising a computation cell to generate a plurality of product terms, a compressor, coupled to the computation cell, and a selector coupled to each of the computation cell and the compressor. The selector, couples one output of the computation cell to an input of the compressor, and selects whether the compressor receives the partial product term from the compressor or an inverse thereof. The compressor is used to generate a pair of product terms from the received plurality of product terms.

BRIEF DESCRIPTION OF DRAWINGS

The present invention will be described by way of illustration, but not limitations, in accordance with the accompanying figures in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. As to the flow charts, each block within the flowcharts represents both a method step and an apparatus element for performing the method step. Moreover, the depicted order of said flowcharts is intended as illustrative only, and is not intended to represent any particular dependence. Depending on the implementation, the corresponding apparatus element may be configured in hardware, software, firmware or combinations thereof.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
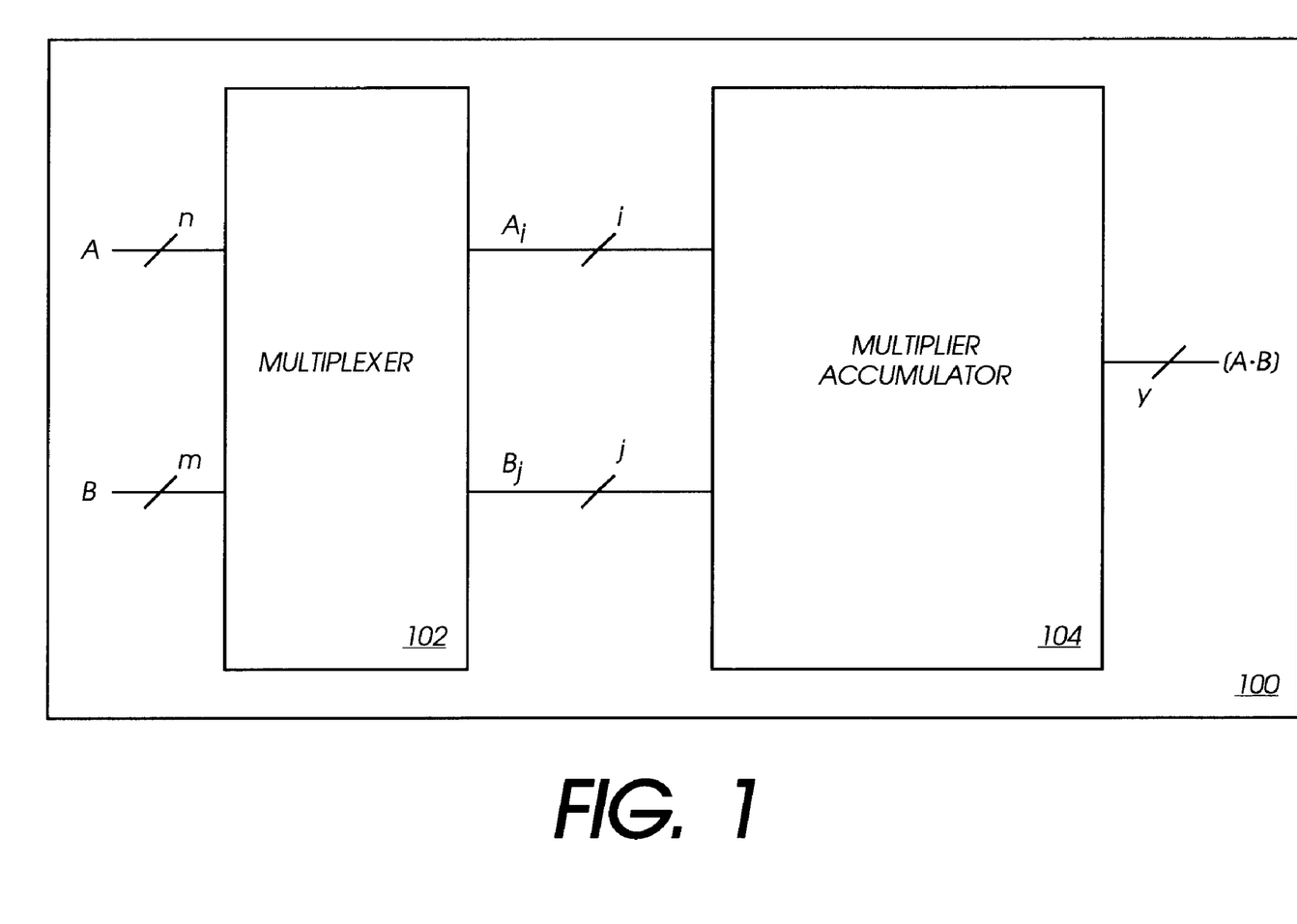
FIG. 1 illustrates a block diagram of an example signed/unsigned multiplier incorporating the teachings of the present invention.

The block diagram of FIG. 1 is presented to place the teachings of the present invention in the proper context. FIG. 1 provides a block diagram of the multiplier circuitry of a controller incorporating the teachings of the present invention. In accordance with the illustrated example embodiment of FIG. 1, controller 100 is depicted comprising multiplexer 102 coupled to multiplier 104 incorporating the teachings of the present invention for performing signed and unsigned multiplication using the same (i.e., common) computational resources. More specifically, as will be described in greater detail below, multiplier 104 utilizes common computational and compressor circuitry to perform multiplication both signed and unsigned multiplication by selectively employing a modified Baugh-Wooley algorithm. A complete description of the Baugh-Wooley algorithm can be found, for example, in *A Two's Complement Parallel Array Multiplication Algorithm, IEEE Transactions on Computers*, vol. C-22, No. 12 (December 1973).

As depicted in FIG. 1, multiplexer 102 receives up to an n-bit multiplicand A and up to an m-bit multiplier B as inputs, which are then selectively supplied to multiplier 104 to calculate a product of A[n] and B[m] in accordance with the teachings of the present invention. In one embodiment, multiple iterations are necessary to accommodate large multiplicands and/or multipliers A and B, respectively. As will be described in greater detail below, multiplier 104 performs multiplication on signed and unsigned multipliers and multiplicands. In particular, multiplier 104 performs carry save multiplication on unsigned numbers, while applying a modified Baugh-Wooley algorithm to perform multiplication on numbers in signed format. Accordingly, multiplier 104 selectively invokes the modified Baugh-Wooley algorithm to perform multiplication of signed numbers using the same computational resources used to perform multiplication on unsigned numbers, thereby alleviating the need for separate circuitry to perform such calculations.

It should be noted that controller 100 of FIG. 1 has been dramatically simplified in order to highlight the teachings of the present invention. Those skilled in the art will appreciate that typical controllers, floating point units (FPU's), digital signal processors (DSP), and the like may well contain more functional blocks than are depicted in FIG. 1. A floating point unit, for example, may well contain a multiply accumulator block including the multiplier 104 as well as an adder, a register file, a conversion block and the like. Accordingly, such modification to the block diagram of FIG. 1 are anticipated within the scope of the present invention. Furthermore, it should be appreciated that the teachings of the present invention may well take many forms. Accordingly, those skilled in the art will recognize that while controller 100 is but an example embodiment within which the teachings of the present invention may be practiced, other suitable embodiments are anticipated with the spirit and scope of the present invention, as defined by the claims appended hereto.

Figure 2:
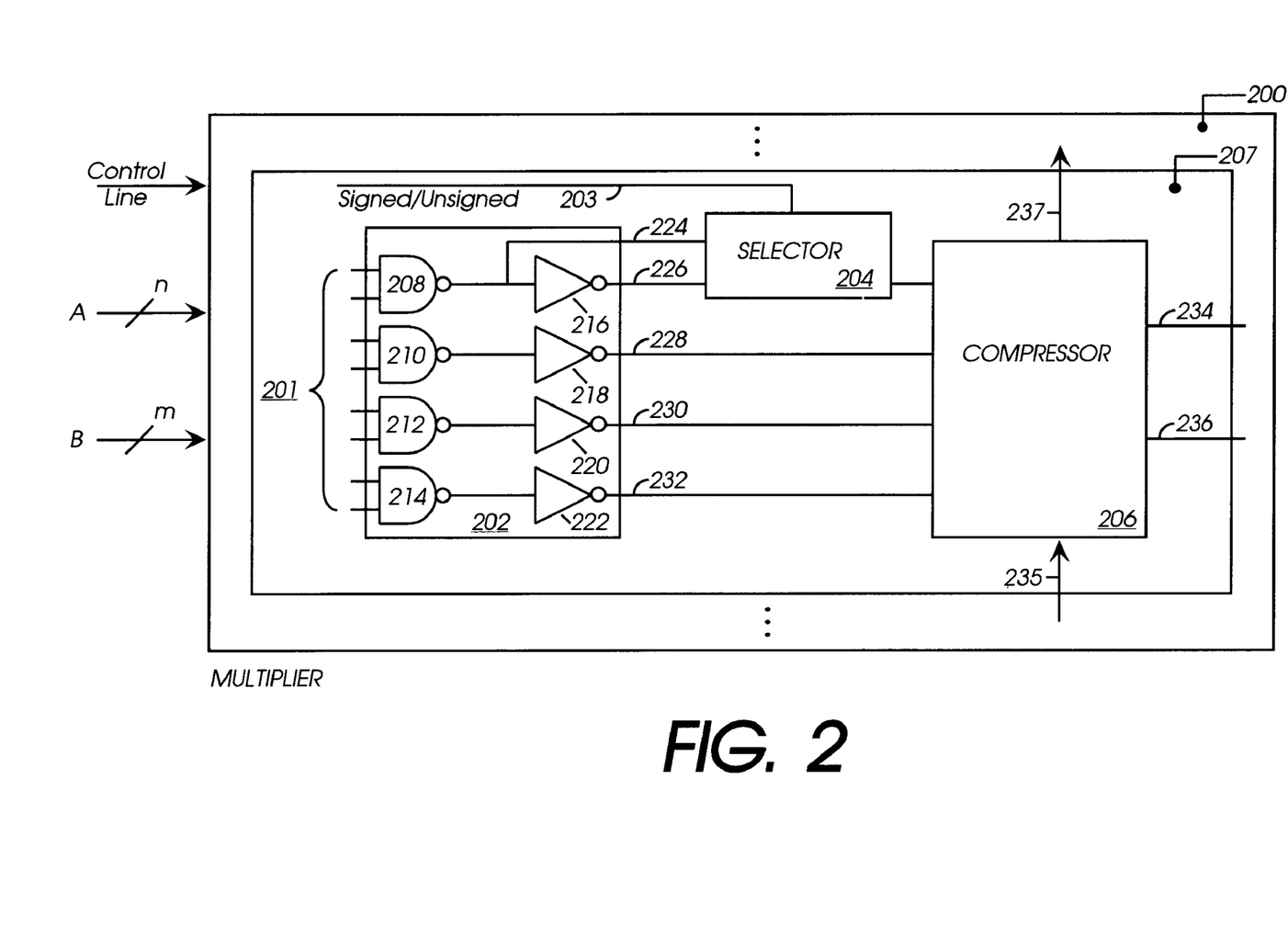
FIG. 2 illustrates a circuit diagram of an example signed/unsigned multiplier incorporating the teachings of the present invention, in accordance with one embodiment of the present invention.

Having introduced an example operating environment within which the teachings of the present invention may be practiced with reference to FIG. 1, reference is now made to FIG. 2 wherein a block diagram of an example multiplier incorporating the teachings of the present invention is presented. In accordance with the illustrated example embodiment of FIG. 2, select circuitry of a single computation node 207 of innovative multiplier 200 incorporating the teachings of the present invention is depicted comprising computational cell 202, compressor 206 and selector 204. In one embodiment, multiplier 200 incorporating the teachings of the present invention may well be incorporated into controller 100 as multiplier 104. For ease of explanation and clarity only a single computation node 207 incorporating the teachings of the present invention is presented in FIG. 2. Those skilled in the art will appreciate, however, that multiplier 200 may well contain up to a plurality of such computation nodes depending on the complexity of the multiplier required for a particular implementation. Accordingly, the example embodiment of FIG. 2 is be regarded as illustrative, as multipliers of greater complexity incorporating the teachings of the present invention are indeed anticipated within the spirit and scope of the present invention.

In accordance with the teachings of the present invention, as depicted in FIG. 2, multiplier 200 receives multiplicand and multiplier input in either the signed or unsigned format as denoted by control line 203 and provides such input to computation cell 202 via input lines 201, which generates a plurality of partial product terms at least a subset of which are provided to compressor 206. In accordance with the illustrated example embodiment, the partial product terms are generated by unate gates, e.g., NAND gates 208–214, and inverters 216–222. Those skilled in the art may well appreciate that use of NAND gates followed by inverters provides some collateral benefits in terms of the cost and real-estate associated with the integration of such logic within an integrated circuit. However, alternate configurations of combinatorial logic may well be employed to generate the combination of partial product terms 224–232 without deviating from the spirit and scope of the present invention. Accordingly, such alternative embodiments are anticipated by the teachings of the present invention.

As shown in FIG. 2, compressor 206 selectively receives four partial product bits 228–232 from computation cell 202 and/or selector 204, and compresses the bits along with a carry-in term 235 (received from another compressor (not shown), unless compressor 206 is the first compressor in the circuit) into a carry out term 237 (destined for another compressor (not shown), unless compressor 206 is the final compressor in the circuit), a sum term 236 and a carry bit 234. In one embodiment, compressor 206 is a carry-save adder 42 cell (compresses four bits into two) which are commonly used in multiplier circuitry and known to those skilled in the art. Thus, they need not be further described herein. In accordance with the teachings of the present invention, computational cell 202 and selector 204 selectively supply a standard compressor, e.g., compressor 206, with the appropriate partial product terms necessary to complete the multiplication of a multiplicand with a multiplier using the same circuitry, without regard to whether the multiplicand and multiplier are signed or unsigned numbers.

As alluded to above, selector 204 selectively forwards either the inverted or non-inverted output of select product terms generated by computational cell 202 to compressor 206 based, at least in part, upon whether signed or unsigned input has been received as denoted by control line 203. In one embodiment, control line 203 denoting signed or unsigned input is controlled by a host of innovative multiplier 200, e.g., processor, controller, programmable logic device (PLD), application specific integrated circuit (ASIC) and the like (not shown). In an alternate embodiment, control line 203 is controlled by a non-hosting device, e.g., a remote processor, controller, PLD, ASIC and the like. In one embodiment, the un-inverted partial product term 226 is provided to compressor 206 for multiplication of un-signed numbers, while inverted partial product term 224 is provided in support of the modified Baugh-Wooley algorithm for multiplication of signed numbers. In one embodiment of the present invention, selector 204 is a single transmission gate, which selects either the inverted or non-inverted output of select partial products of computational cell 202. In alternate embodiments, however, a buffered multiplexer may well be utilized to selectively supply compressor 206 with either the inverted or non-inverted partial product terms.

As alluded to above, those skilled in the art will appreciate that the block diagram of FIG. 2 depicts but select circuitry of one computation node 207 of multiplier 200, and that multiplier 200 may well contain many more computation nodes of greater or lesser complexity. More specifically, references to ground and power sources have been omitted so as to not obscure the teachings of the present invention, however those skilled in the art will appreciate that ground and power source inputs are generally available within such circuitry. Moreover, in alternate embodiments, computation nodes 207 may well be arranged to reduce the amount of circuitry required by multiplier 200, e.g., in a hierarchy. Similarly, although computation node 207 of multiplier 200 depicted in FIG. 2 accommodates four-bit multipliers and multiplicands, those skilled in the art will appreciate that this is for ease of explanation only, and that computation nodes accommodating multipliers/multiplicands of greater or lesser complexity are expressly anticipated by the present invention. Accordingly, the present invention may well be practiced in various forms without deviating from the fundamental spirit and scope of the present invention.

Although the architectural elements of the present invention have been described, above, a basic understanding of the modified Baugh-Wooley algorithm is required to fully appreciate the innovation represented by computational cell 202 and selector 204 to selectively multiply signed and unsigned multiplication using the same circuitry. The modified Baugh-Wooley algorithm, as implemented herein, generally requires that the most significant partial product bit of each partial product term be inverted, except for the lowest partial product row, wherein all bits other than the most significant bit of the partial product term are inverted. In addition, the modified Baugh-Wooley algorithm requires that logic 1's be selectively inserted in the final partial product term. To further illustrate the application of the modified Baugh-Wooley algorithm, reference is made to Table 1, wherein the modified Baugh-Wooley algorithm is implemented to multiply A[7:0] by B[3:0] in signed format.

significant bit of the partial product term, A7B0, is inverted, as represented by A7B0*. In Steps 2 and 3 of Table 1, similar multiplication steps are performed, albeit by multiplying A[7:0] by B[1] and B[2], respectively, followed by the inversion of each of the most significant bits of their respective partial product terms. In Step 4 of Table 1, the final partial product term is computed by multiplying A[7:0] with the most significant bit of the multiplier B[3]. In accordance with the teachings of the modified Baugh-Wooley algorithm, the most significant bit of this, the final partial product term A7B3 is not inverted, while the remaining least significant bits A[6:0]B3 are inverted, as represented by A[6:0]B3*. In Step 5, an additional partial product row is added, wherein a logic 1's are selectively inserted as the most significant bit of each nibble (i.e., 4 bits) of the additional partial product row, while the remaining partial product terms of the additional partial product row are not used. Each column of the partial product rows are then summed to generate the product of the multiplicand A and multiplier 13. Thus, in accordance with the teachings of the present invention, innovative computational cell 202 and selector 204 enable multiplier 200 to selectively invoke the modified Baugh-Wooley algorithm to perform signed multiplication using the same circuitry that is used to perform unsigned multiplication.

Given the foregoing introduction to the modified Baugh-Wooley algorithm, and continued reference to multiplier 200 in FIG. 2, those skilled in the art will appreciate that control of selector 204 determines whether partial product term 226 or an inverted partial product term 224 for a select multiplier/multiplicand input is provided to compressor 206 for compression and thus, whether multiplier 200 is performing signed or unsigned multiplication. That is, innovative multiplier 200 supports the multiplication of signed and unsigned numbers without the need for duplicate circuitry through the selective control of selector 204, as described above.

Figure 3:
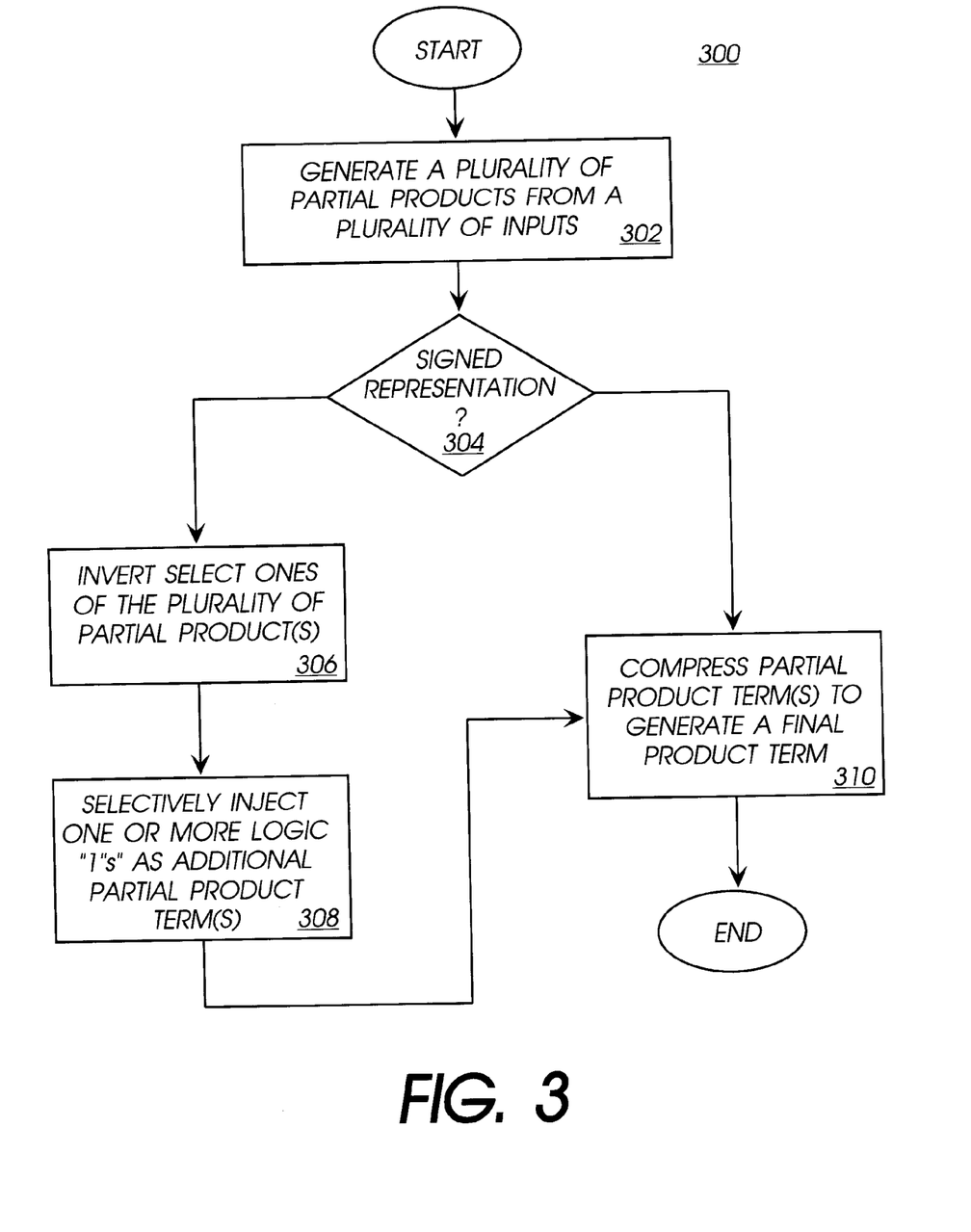
FIG. 3 illustrates a flow chart of an example method for multiplying signed or unsigned numbers in accordance with one embodiment of the present invention.

Having introduced the architectural and functional elements and features of the present invention with reference to FIGS. 1 and 2, above, a flow chart illustrating an example method for multiplying signed and unsigned numbers utilizing the same computational circuitry is presented in FIG. 3, in accordance with one embodiment of the present invention. For ease of explanation, and not limitation, the method of operation illustrated in FIG. 3 will be developed with continued reference to FIG. 2.

Turning to FIG. 3, an innovative method 300 for performing signed and unsigned multiplication utilizing the same computational circuitry begins with block 302, wherein a plurality of partial product terms are generated from a

TABLE 1

Application of the modified Baugh-Wooley algorithm

| | | | | | | | | | | | |
| --- | --- | --- | --- | --- | --- | --- | --- | --- | --- | --- | --- |
| Step 1 | | | | | A7B0* | A6B0 | A5B0 | A4B0 | A3B0 | A2B0 | A1B0 | A0B0 |
| Step 2 | | | | A7B1* | A6B1 | A5B1 | A4B1 | A3B1 | A2B1 | A1B1 | A0B1 | — |
| Step 3 | | | A7B2* | A6B2 | A5B2 | A4B2 | A3B2 | A2B2 | A1B2 | A0B2 | — | — |
| Step 4 | | A7B3 | A6B3* | A5B3* | A4B3* | A3B3* | A2B3* | A1B3* | A0B3* | — | — | — |
| Step 5 | 1 | — | — | — | 1 | — | — | — | 1 | — | — | — |
| SUM: | P11 | P10 | P09 | P08 | P07 | P06 | P05 | P04 | P03 | P02 | P01 | P00 |

With reference to Table 1, the row defined by Step 1 illustrates the partial products for each bit of the multiplicand A[7:0] when multiplied by the least significant bit of the multiplier B[0]. In accordance with the modified Baugh-Wooley algorithm introduced above, however, the most plurality of inputs. In accordance with the illustrated example embodiment of FIG. 2, for example, a plurality of partial product terms 224–232 are generated by computational cell 202 from a plurality of inputs 201 representing a signed or unsigned multiplicand and multiplier. In accordance with the teachings of the present invention, compressor 202 effectively ANDs and/or NANDs the bits of the multiplier and multiplicand represented by inputs 201 to generate the partial product terms 224–232, as shown.

At block 304 of FIG. 3, a determination is made whether the multiplication is being performed on signed or unsigned inputs 201. In one embodiment, for example, a control line coupled to selector 204 denotes whether signed or unsigned multiplication is being performed. As described above, a host processor or separate controller makes this determination and manipulates the control line of the innovative multiplier described herein accordingly. In accordance with the illustrated example embodiment, selector 204 passes either the inverted 224 or un-inverted 226 product of a select partial product term to compressor 206 based, at least in part, on the control signal received. If the control line denotes un-signed multiplication, selector 204 selects the un-inverted partial product term 226 (i.e., the inverted NAND terms) which is supplied along with partial product terms 228–232 to compressor 206 for carry save compression, block 310.

Alternatively, if in block 304 the control line is asserted to denote signed multiplication is to be performed, the inverted product term 224 (i.e., the NANDed term) along with partial product terms 228–232 are provided to compressor 206 for carry-save compression, block 306, in application of the modified Baugh-Wooley algorithm for multiplying signed numbers. In block 308, having generated all of the partial product terms and inverting select bits in block 306, logic 1's are selectively injected as additional partial product terms. In accordance with the illustrated example embodiment of FIG. 2, logic 1's are selectively injected by applying a logic 0 to the inputs, and selecting the inverted value at appropriate locations. In one embodiment, a logic 0 is provided to the inputs by selectively tying the input lines 201 to ground.

Once the partial product terms have been calculated by computation cell 202, they are selectively applied by computation cell 202 and selector 204 to compressor 206 for carry-save compression as described above, block 310.

Figure 4:
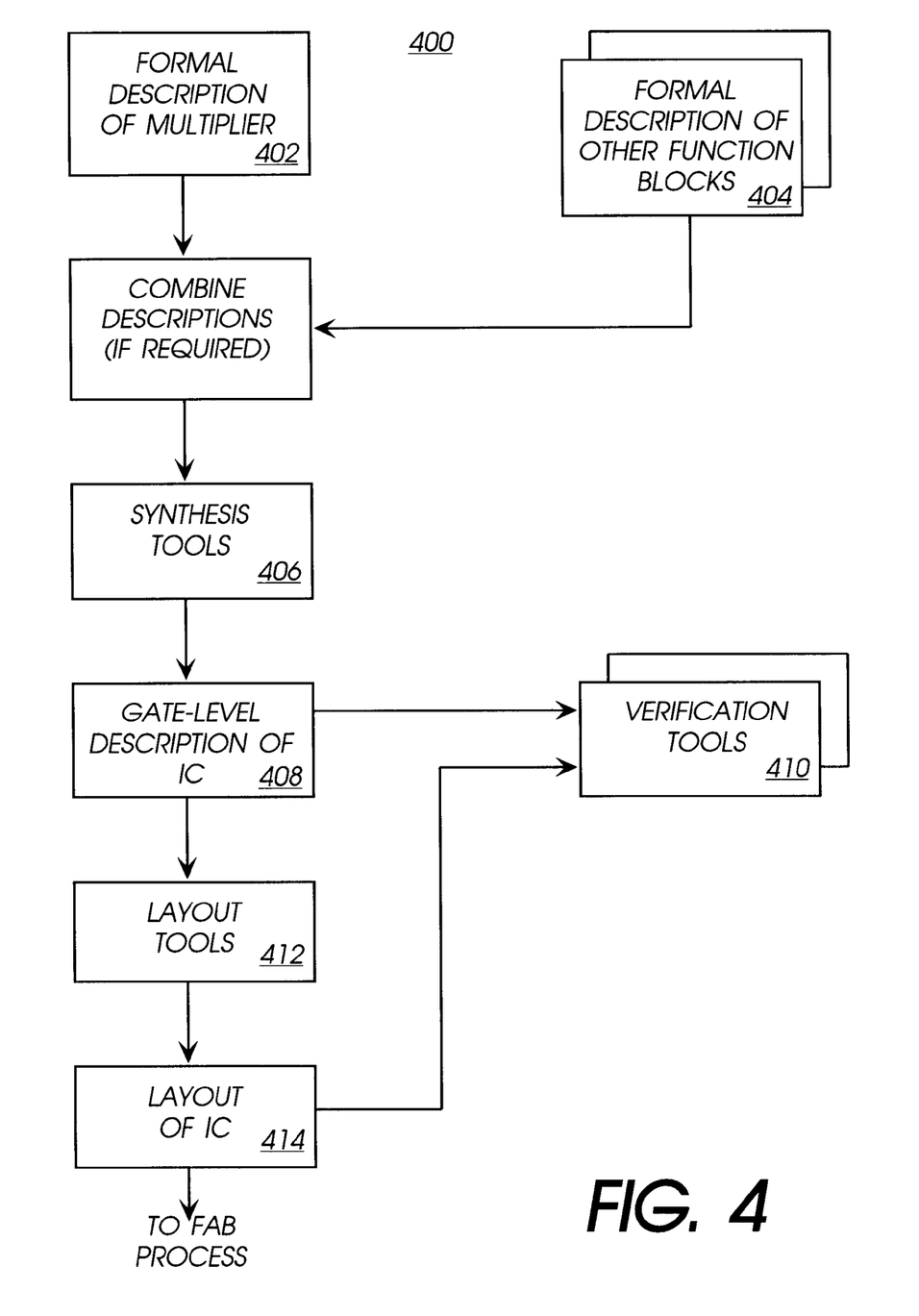
FIG. 4 illustrates a block diagram of a process for creating an integrated circuit (IC) incorporating the teachings of the present invention, in accordance with one embodiment of the present invention.

Turning now to FIG. 4, a block diagram illustrating one embodiment of a design process for designing an IC incorporated with the innovative signed/unsigned multiplier of the present invention is shown. As illustrated, a formal description 1602 of the multiplier is prepared. Formal description 1602 may be prepared in any one of the formal IC description languages known in the art, e.g., Very High Speed Integrated Circuit (VHSIC) Hardware Description Language, or VHDL, Verilog, and the like, using any one of a number of known design description editors supporting the desired formal description language.

Formal description 1602 is then optionally merged with formal descriptions 1604 of other function blocks of the IC, if the signed/unsigned multiplier is to be fabricated as an integral part of a "larger" IC. Formal description 1602, or the merged formal descriptions 1602 and 1604, are then provided to synthesis tools 1606 to synthesize, i.e. to generate, a gate-level description 1608 of the IC to be fabricated. The gate-level description 1608 may then be used by a number of verification tools 1610, such as simulators or emulators, to verify the correctness of the design. An example of a verification tool is the SimExpress™ emulator product manufactured by Meta System of Saclay, France, a wholly owned subsidiary of the assignee of the present invention.

Upon verification, or in parallel, gate-level description 1608 of the IC is then provided to layout tools 1612 to generate physical layout description 1614 of the IC. Layout description 1614 is also subjected to verification by layout level ones of verification tools 1610. An example of layout level verification is parasitic analysis for submicron level integration. Upon verification, layout description 1614 of the IC is then provided to the fabrication process to fabricate the desired IC.

Those skilled in the art will appreciate that the design process and the fabrication process may be performed by different parties. In fact, the creation of formal description 1602 may be performed by a party independent of the party or parties who prepare formal descriptions 1604 for the other function blocks, and/or the party or parties who perform the synthesis, verifications, etc. Formal description 1602 may be provided to these other parties via any one of a number of known data transfer methods, e.g. through removable storage medium such as magnetic tape, compact disk (CD), digital versatile disk (DVD), and the like, or through networked data communication links. In this context, formal description 1602 is often referred to as a "soft core".

Figure 5:
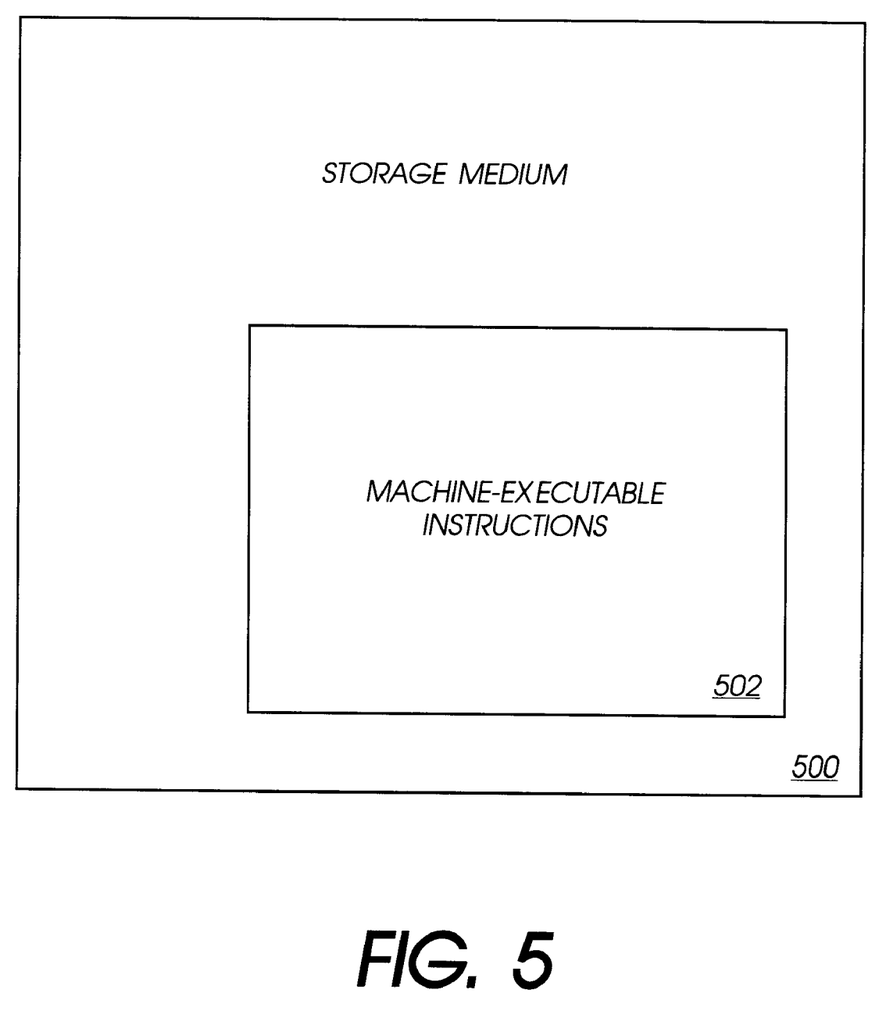
FIG. 5 illustrates a block diagram representation of a storage medium having stored thereon a plurality of machine executable instructions for implementing the teachings of the present invention, in accordance with one embodiment of the present invention.

While the foregoing description has described the present invention in terms of an IC implementation, those skilled in the art will also appreciate that the present invention may be practiced in a software embodiment, implemented in any one of a number of programming languages known in the art, e.g. the C++ programming language. FIG. 17 illustrates an exemplary storage medium 1700 having stored thereon machine executable instructions 1702 of one such software embodiment. As depicted, storage medium 1700 is intended to represent a broad range of storage media and memory devices including but not limited to the media enumerated above. The machine readable instructions of the illustrated software embodiment, when processed by a suitable processor, implements the signed/unsigned multiplier incorporating the teachings of the present invention as described above.

Thus, a method and apparatus for performing signed/unsigned multiplication has been described. Those skilled in the art will appreciate that the method and architecture presented above integrates what heretofore required two multipliers into a single multiplier capable of performing both signed or unsigned multiplication. While the method and apparatus of the present invention has been described in terms of the above illustrated example embodiments, those skilled in the art will recognize that the invention is not limited to the example embodiments described. That is, the present invention can be practiced with modification and alteration without deviating from the spirit and scope of the appended claims. Thus, the description is to be regarded as illustrative instead of restrictive on the present invention.

What is claimed is:

1. An apparatus comprising:
    a computation cell to receive a plurality of inputs and generate a plurality of partial product terms from said inputs;
    a compressor, coupled to the computation cell, to compress the plurality of partial product terms to a pair of product terms; and
    a selector, coupled between the computation cell and the compressor, to select and pass either a standard partial product term or an inverse thereof to the compressor, based on whether signed or unsigned multiplication is being performed, respectively.

2. The apparatus of claim 1, wherein the computation cell is comprised of a plurality of unate gates.

3. The apparatus of claim 2, wherein the unate gates are NAND gates in series with an inverter.

4. The apparatus of claim 2, wherein the computation cell comprises a power source and a ground source, wherein either the power source or the ground source are selected to supply a partial product term.

5. The apparatus of claim 1, wherein the standard partial product term is selected during unsigned multiplication.

6. The apparatus of claim 1, wherein the inverse of the standard partial product term is selectively selected during signed multiplication.

7. The apparatus of claim 1, wherein the inverse of the standard partial product term is selected in accordance with application of a signed number multiplication algorithm.

8. The apparatus of claim 7, wherein the signed number multiplication algorithm is a modified Baugh-Wooley signed number multiplication algorithm.

9. A method for performing signed as well as unsigned multiplication utilizing common multiplier circuitry, the method comprising:
  generating a plurality of partial product terms, as well as an inverse of select partial product terms;
  determining whether signed multiplication is being performed;
  compressing the plurality of partial product terms including the inverse of select partial product terms if signed multiplication is being performed.

10. The method of claim 9 further comprising compressing the plurality of partial product terms not including the inverse of select partial product terms if unsigned multiplication is being performed.

11. The method of claim 9, further comprising selectively injecting logic 1's into the plurality of partial product terms if signed multiplication is being performed.

12. The method of claim 9, further comprising selectively inverting partial product terms in accordance with a modified Baugh-Wooley algorithm if signed multiplication is being performed.

13. An integrated circuit comprising:
  a computation cell to receive a plurality of inputs and generate a plurality of partial product terms from said inputs;
  a compressor, coupled to the computation cell, to compress the plurality of partial product terms to a pair of product terms; and
  a selector, coupled between the computation cell and the compressor, to select and pass either a standard partial product term or an inverse thereof to the compressor, based on whether signed or unsigned multiplication is being performed, respectively.

14. The IC of claim 13, wherein the computation cell is comprised of a plurality of unate gates.

15. The apparatus of claim 13, wherein the standard partial product term is selected during unsigned multiplication.

16. The apparatus of claim 13, wherein the inverse of the standard partial product term is selectively selected during signed multiplication.

17. A machine readable storage medium having stored thereon formal descriptions describing a multiplier operative to perform signed and unsigned multiplication utilizing common circuitry, wherein when synthesized, said formal descriptions yield a gate-level description of an integrated circuit including said computational logic.

18. The machine readable storage medium of claim 17, wherein the multiplier implements a modified Baugh-Wooley algorithm for performing signed multiplication.

19. An integrated circuit (IC) including a multiplier to multiply signed and unsigned numbers utilizing common circuitry, the IC created by a process comprising:
  combining formal descriptions describing the multiplier with formal descriptions of at least one other function block of the IC to produce a combined formal description of the IC; and
  synthesizing the combined formal description to generate a gate-level description of the IC.

20. The IC created by the process of claim 19, further comprising fabricating the IC including the multiplier based, at least in part, on the gate-level description of the IC synthesized from the combined formal description.

21. The IC created by the process of claim 19, wherein the multiplier utilizes a modified Baugh-Wooley algorithm to perform signed multiplication utilizing the same circuitry employed for unsigned multiplication.

* * * * *